United States Patent
Kaise et al.

(10) Patent No.: US 6,425,061 B1
(45) Date of Patent: Jul. 23, 2002

(54) APPARATUSES FOR EXCHANGING INFORMATION OVER COMPUTER AND BROADCAST NETWORKS

(75) Inventors: Tetsuya Kaise, Tokyo; Toru Sugiyama; Seijiro Yasuki, both of Kanagawa-ken, all of (JP)

(73) Assignee: Kabushiki Kaisha Toshiba, Kanagawa-Ken (JP)

(*) Notice: Subject to any disclaimer, the term of this patent is extended or adjusted under 35 U.S.C. 154(b) by 0 days.

(21) Appl. No.: 08/940,199

(22) Filed: Sep. 29, 1997

(30) Foreign Application Priority Data

Sep. 27, 1996 (JP) .............................. 8-256731

(51) Int. Cl.⁷ .............................................. G06F 12/14
(52) U.S. Cl. ...................... 711/163; 711/115; 711/167
(58) Field of Search ................. 711/100, 115, 711/152, 164, 163

(56) References Cited

U.S. PATENT DOCUMENTS 5,813,010 A * 9/1998 Kurano et al. ............. 707/100
5,887,145 A * 3/1999 Harari et al. ............... 711/103

FOREIGN PATENT DOCUMENTS

JP 8-97784 4/1996

OTHER PUBLICATIONS

HTML in "Hyper Text Markup Language CHTML/2.0", T. Berners–Lee, or HTML Working Group Internet–Draft, Aug. 8, 1995.
"The Point–to–Point Protocol (PPP)", W. Simpson et al, Network Working Group, RFC 1661.
"Hypertext Transfer Protocol CHTTP/1.0", T. Berner–Lee et al , HTTP Working Group, Internet–Draft, Sep. 4, 1995.

* cited by examiner

Primary Examiner—Jack A. Lane

(57) ABSTRACT

Information service receiving apparatus having a managing information reader for reading managing information pre-stored in a removable storage medium while the storage medium is inserted, principal information capturor for capturing principal information which is provided by a predetermined information service provider, a specific information extractor for extracting specific information, which has a predetermined relationship with a key code contained in the managing information readout by the managing information reader, from the principal information captured by the principal information capturer and a data writer for writing the specific information extracted by the specific information extractor in the inserted storage medium.

6 Claims, 16 Drawing Sheets

TRAFFIC 1

HIGHWAY TRAFFIC INFORMATION

CURRENT TIME : 14:00

TOMEI - HIGHWAY : SMOOTH

CHUOH - HIGHWAY : JAMMING 3.0 km

[ PREVIOUS PAGE ]   [ NEXT PAGE ]

APPARATUSES FOR EXCHANGING INFORMATION OVER COMPUTER AND BROADCAST NETWORKS

FIELD OF THE INVENTION

The present invention relates to an apparatus and method for receiving information services such as teletext services transmitted through broadcast waves or INTERNETS.

BACKGROUND OF THE INVENTION

In recent years, two-way services which use the telephone line as a communication medium have grown in use. For example, "teleshopping" makes purchasing goods within a home and via a telephone line or personal computer telecommunications and exchanging information in the form of character data possible. In the future a "video on demand" service for individually providing selected programs of movies or TV programs to respective receivers in response to receiver's demands is expected.

Further, it is possible to participate in a global scale network, e.g., INTERNET from the home. The INTERNET will perform an Information exchange using an electronic mail (E-mail) or a WWW (world wide web) system at a global scale. The WWW system transfers data written by the HTML (Hyper Text Transfer Protocol) using a HTTP (Hyper Text Transfer Protocol). The transferred data can be graphically displayed by a "WWW browser" such as, e.g., a "Mosaic". Teleshopping, information services or advertisements and the like are also achieved by way of using the WWW system.

Further, a teletext has been performed for providing information service by way of using TV broadcast waves. A two-way service to transmit data to a broadcasting station by teletext using broadcast wave and the telephone line is about to be performed. Further, an "inter-text" service having a higher interactive ability than the teletext is under consideration for its service.

FIG. 12 is a schematic diagram showing a two-way service using a server.

The first station A and the second station B exchanges data between each other via the telephone line C. The first station A receives a TV broadcast wave by an antenna 8 and derives information from the received TV broadcast wave.

The first station A includes an information processing terminal devise 1, an analog modern 2, and a video signal processing block 3. The second station B is comprised of a modem 4, a server 5 which is a type of the information processor an auxiliary memory 6, and a network interface 7.

The server 5 is a type of computer for performing a proper processing in response to instructions from the information processing block 1. The server 5 is connected to a wide area network, e.g., so called INTERNET via the network interface. The INTERNET is a global scale network and is connected to an unlimited number of computers. The server 5 is able to obtain information held in other computers via the INTERNET.

Now data communication between the first station A and the second station B will be explained.

The first station A has a conventional arrangement for performing communications using personal computers in general homes. The second station B shows the most basic conceptual arrangement of the so called INTERNET provider.

Generally, the first station A obtains an account of accessing the server 5 and a phone number of the second station B in order to communicate with the second station B.

FIG. 13 illustrates a case in which the first station A is already subscripting with the second station B. First, the first station A requests a call connection through a telephone line C to the second station B (see 191 in FIG. 13). Thus the connection is established between modem 2 and modem 4.

Station A then establishes a connection between the information processing block I and the server 5 through software. Such a connection in software is made by using a data link layer of PPP (see 192 in FIG. 13), and a transport layer and network layer of TCP/IP (Transmission Control Protocol/INTERNET Protocol) (see 193, 194 in FIG. 13). Here the PPP Is described In "The point-to-point Protocol (PPP), W. Simpson et al. Network Working Group, RFC 1661.

If the connection between the first station A and the second station B is established, the first station A can obtain information available through, for example, the WWW system. The protocol for realizing the WWW system is given by the http (see 195 in FIG. 13) representing a session layer of an OSI reference model, a presentation layer and an application layer. The HTTP is described in "Hypertext Transfer Protocol CHTTP/1.O, T. Berner-Lee et al, HTTP Working Group, INTERNET-DRAFT, Sep. 4, 1995".

Now another information service using the ground wave broadcasting will be explained. In the information service using the ground wave TV broadcasting, data is carried on a part of the vertical sync signal of the video signal.

FIG. 14 is a magnified view of the vertical sync signal of the video signal. Line numbers and their waveforms are shown in detail in FIG. 14. The lines "#10" through "#20" are vertical blanking periods and are hidden outside the TV screen. Lines "#17" through "#20" are used for operations in the broadcasting station. Lines "#14" through "#16" are assigned for transmissions of character data or graphical data referred to as teletext. Further lines "#10" through "#13" are assigned for a future use of services at a higher interactive ability than the current teletext.

Next, a user operation that can be performed on the information processing block I will be explained. FIG. 15 is a diagram showing a conventional arrangement of the information processing block 1 and the video signal processing block 3. As shown in FIG. 15, the information processing block 1 has an information processor 11, a display 12, an auxiliary memory 13 and an input device 14. The display 12, the auxiliary memory 13 and the input device 14 are connected to the information processor 11. And, the modem 2 is also connected to the information processor 11.

The information processor 11 performs basic control by executing an OS (operating system) stored in the auxiliary memory 13. The user accesses a "WWW Browser", such as for example a "Mosaic" developed by the University of Illinois in U.S., on the input device 14. The Information processor 11 reads out the "Browser" application stored in the auxiliary memory 13 and displays it on the display 12. Next, the user inputs a URL (Uniform Resource Locator) that represents an address for identifying information available through the INTERNET. Upon inputting the URL, the user can obtain desired information over the INTERNET. The information processor 11 requests the URL address information assigned to the server 5 to be read out. Then, the server 5 retrieves the assigned URL address Information from the network and returns it to the information processor 11.

The information returned from the server 5 is a hyper link format, that is HTML (as exemplarily discussed in "Hyper Text Markup Language CHTML/2.O", T. Berners-Lee, or HTML Working Group INTERNET-DRAFT, Aug. 8, 1995) format. The information in HTML format is arranged by the Mosaic operating on the information terminal unit 11 and displayed on the display 12 as graphical data.

On the other hand, the video signal processing block 3 has a sync signal separator 31, a waveform equalizer 32 and a data read-out error corrector 33.

The video signal obtained from an antenna 8 is supplied to both the sync signal separator 31 and the waveform equalizer 32. The sync signal separator 31 performs the sync separation from the video signal and generates a timing signal to decide the line numbers. The waveform equalizer 32 eliminates the ghost from the video signal, and then extracts the data carried on the vertical sync period, as shown in FIG. 14, under the timing control of the timing signal generated in the sync signal separator 31. The data read-out error corrector 33 corrects the errors of the data extracted in the waveform equalizer 32 then applies the data to the information processor 11. When the user is selecting the teletext, the information processor 11 generates a picture corresponding to the data supplied from the data read-out error corrector 33 and displays it on the display 12, as shown In FIG. 16.

According to this arrangement, the user can obtain a vast amount of information via the INTERNET and the teletext. For Instance the teletext service provides a variety of information such as political information ("politics") economic information ("economics"), stock information ("stocks"), sports information ("sports"), traffic information ("traffic"), weather information ("weather"), and the like.

Furthermore, it is strongly desired and seemingly convenient to store the captured information in the storage medium such as a memory card as well as display it on the display 12.

However, it is necessary to selectively store necessary information among a vast amount of available information in the memory card in order to use effectively a limited capacity of storage medium such as a memory card Therefore, if the user instructs an operation for selectively writing necessary information among a vast amount of information in the storage medium, the operation of such the instruction will become very complicated and troublesome.

Further, according to this configuration, it is relatively easy to transmit any given data, such as an E-mail data, stored in the storage medium, such as a memory card, via the INTERNET.

However, to transmit E-mail data via the INTERNET the user must carry out a complicated instructing operation. Therefore, it becomes difficult for users who are unfamiliar with the operation to easily deliver E-mail data.

As described above, the conventional information service receiving apparatus overly burdens the user by requiring that the instruction of selecting information be written in the storage medium among a vast amount of available information when the information provided from the information service provider were writable in the storage medium.

Further, the conventional information service receiving apparatus necessitates a complicated operation in order to transfer the data that is stored in the storage medium via the information service provider.

SUMMARY OF THE INVENTION

The present invention has been made in view of the above mentioned problems. Thus, a first object of the present invention is to provide an information service receiving apparatus, an information service providing apparatus and a storage medium suitable for use with the information service receiving apparatus. The information service receiving apparatus can perform writing operations of the information in the storage medium to perform efficiently the writing operations without burdening its users.

A second object of the present invention is to provide an information service receiving apparatus and a storage medium suitable for use with the information service receiving apparatus. The information receiving apparatus can automatically transmit data stored in the storage medium for realizing the information without burdening users of the information service receiving apparatus.

In order to achieve the first object, an information service receiving apparatus according to a first aspect of the present invention includes a managing information reader such as a card managing information reader for reading out managing information presto red in a storage medium. The storage medium can be a removable storage medium such as a memory card, a principal information capturer such as a video signal processor for capturing the principal information provided by a specific information service provider, a specific information extractor that has an information filter and a data extraction processor for extracting, e.g., specific Information associated with a key code contained in the managing information readout by the managing information reader among the principal information captured by the principal information capturer, and a data writer for writing the specific information extracted by the specific extractor in the inserted storage medium.

In order to achieve the second object, an information service receiving apparatus according to a second aspect of the present invention includes a managing information reader such as a card managing information reader for reading managing information presto red in a removable storage medium such as a memory card inserted in the information service receiving apparatus, a principal information reader such as a mail reader for reading out a specific principal information (e.g., E-mail data, hypertext and picture data) presto red in the storage medium when the managing information readout by the managing information reader contains information for instructing an information transmission to other terminals via a specific information service provider, and a principal information transmitter such as a mail transmission processor for transmitting the principal information read out by the principal information reader to the principal information service provider.

In order to achieve the first object, an information service receiving apparatus according to a third aspect of the present invention includes a managing information reader such as a card managing information reader for reading out managing information presto red in a removable storage medium, such as a memory card inserted in the information service receiving apparatus, a key code notifier such as a selective transmission requester for notifying a key code contained in the managing information readout by the managing information reader to the specific information service provider, a principal information capturer that has a video signal processor and an information filter for capturing principal information such as a teletext program data provided by the information service provider in response to a notification of key codes from a key code notifier, and a data writer for writing the principal information captured by the principal information capturer in the storage medium.

In order to achieve the first object, the information service receiving apparatus according to a fourth aspect of the present invention includes a clock device for presenting clock information, and the prohibition processor such as the data receiving prohibitor for prohibiting the writing of the specific information in the storage medium and the transmission of the principal information stored in the storage medium when the clock information presented by the clock device had expired the term of validity presented in the managing information read out by the managing information reader.

In order to achieve the first object, a fifth aspect of the present invention has an Information service providing apparatus that provides a lot of the principal information (e.g., teletext program data) available to the providing apparatus itself to the specific information service receiving apparatus as necessary, comprising specific information extractor such as a data extraction requester for extracting the specific information having a specific relationship with the notified key code among the lots of available principal information in response to a specific key code notified from the information service receiving apparatus, and the specific information transmitter which is comprised of, e.g., a requested data transmission controller, a teletext signal producer and a multiplexer for transmitting only the specific information extracted by the specific information extractor to the information service receiving apparatus originating the key code.

In order to achieve the first and the second objects, the storage medium according to a sixth aspect of the present invention has a memory space for storing the specific managing information indicating types of information services admitted in the information service receiving apparatus in a rewrite-protected manner, as long as there is at least no specific prohibition release instruction and for reading and writing any given principal information by the information service receiving apparatus.

According to the first aspect of the present invention, only information associated with a key code contained in the managing information presto red in the storage medium among principal information provided by a specific information service provider is written in the inserted storage medium. It is thus possible to store desired information into the storage medium if the storage medium that has a key code associated with the desired information is inserted in the information service receiving apparatus of the present invention.

According to the second aspect of the present invention, when the managing information stored in the loaded storage medium includes other information instructing data transmissions to other terminals via a specific information service provider, the data stored in the storage medium is read out therefrom and then automatically transmitted to the specific information service provider. Accordingly If an E-mail data is stored in the inserted storage medium together with information for instructing a transmission of information to other terminals via the specific information service provider, then it is possible to transmit the Email data.

According to the third aspect of the present invention, only the information provided by the information service provider when the key code contained in the managing information presto red in the storage medium was notified to the specific information service provider is written in the inserted storage medium. Accordingly, when the information service receiving apparatus is combined with the information service providing system according to the fifth aspect of the present invention, and a storage medium having a preset key code associated with desired information is inserted in the receiving apparatus, it is possible to store the desired information into the storage medium.

According to the fourth aspect of the present invention, when an effective term contained in the managing information presto red in the inserted storage medium, it is able to protect rewriting for the storage medium or transmission of the principal information stored in the storage medium. Accordingly, it is also able to limit available terms of information services provided by using every storage medium.

According to the fifth aspect of the present invention, when a specific key code is notified from the information service receiving apparatus, information specifically related to the notified key code is extracted from a vast amount of available principal information and only the specific information thus extracted is directed to the information service apparatus originating the key code. Accordingly, when the information service providing apparatus is combined with the information service receiving apparatus according to the third aspect of the present invention, the providing apparatus is able to provide information only for the information service receiving apparatus.

According to the sixth aspect of the present invention, although the principal information is freely read from or written to a given principal information memory space by the information service receiving apparatus, specific managing Information indicating types of information services admitted in the information service receiving apparatus is protected from rewritings as long as there is at least no specific prohibition release instruction. Accordingly, specified persons, e.g., the information service provider is able to manage the use of the information service by using the storage medium and prevent an illegal use of the information service.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily captured as the same becomes better understood by reference to the following detailed description when considered in connection with the accompanying drawings, wherein:

FIG. 16 is a diagram showing the display example of the information received via the teletext.

DESCRIPTION OF THE PREFERRED EMBODIMENTS

The present invention will be described in detail with reference to the FIGS. 1 through 11.

Figure 1:
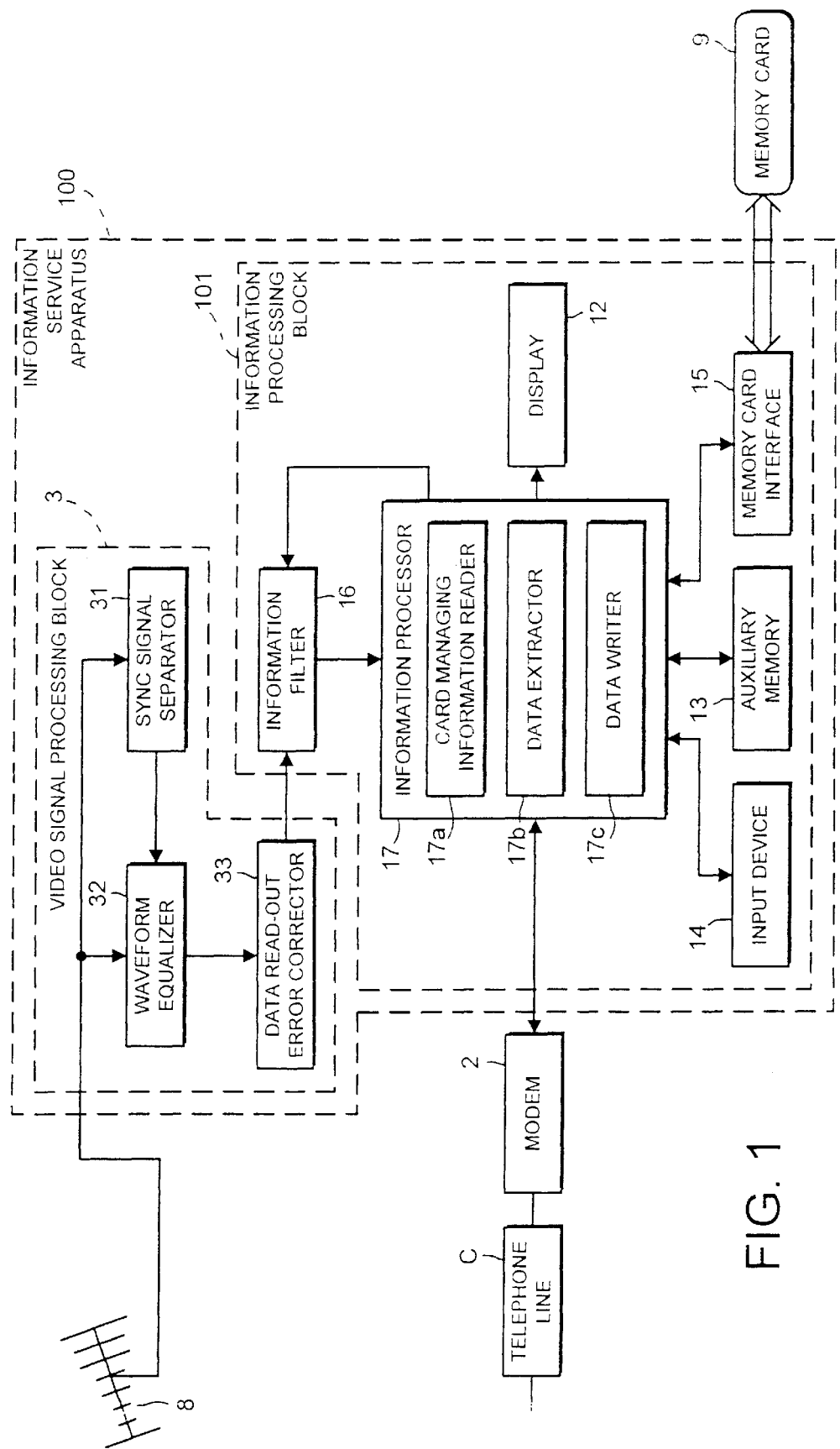
FIG. 1 is a functional block diagram showing a principal part of the information service receiving apparatus according to the first embodiment of the present invention.
Figure 15:
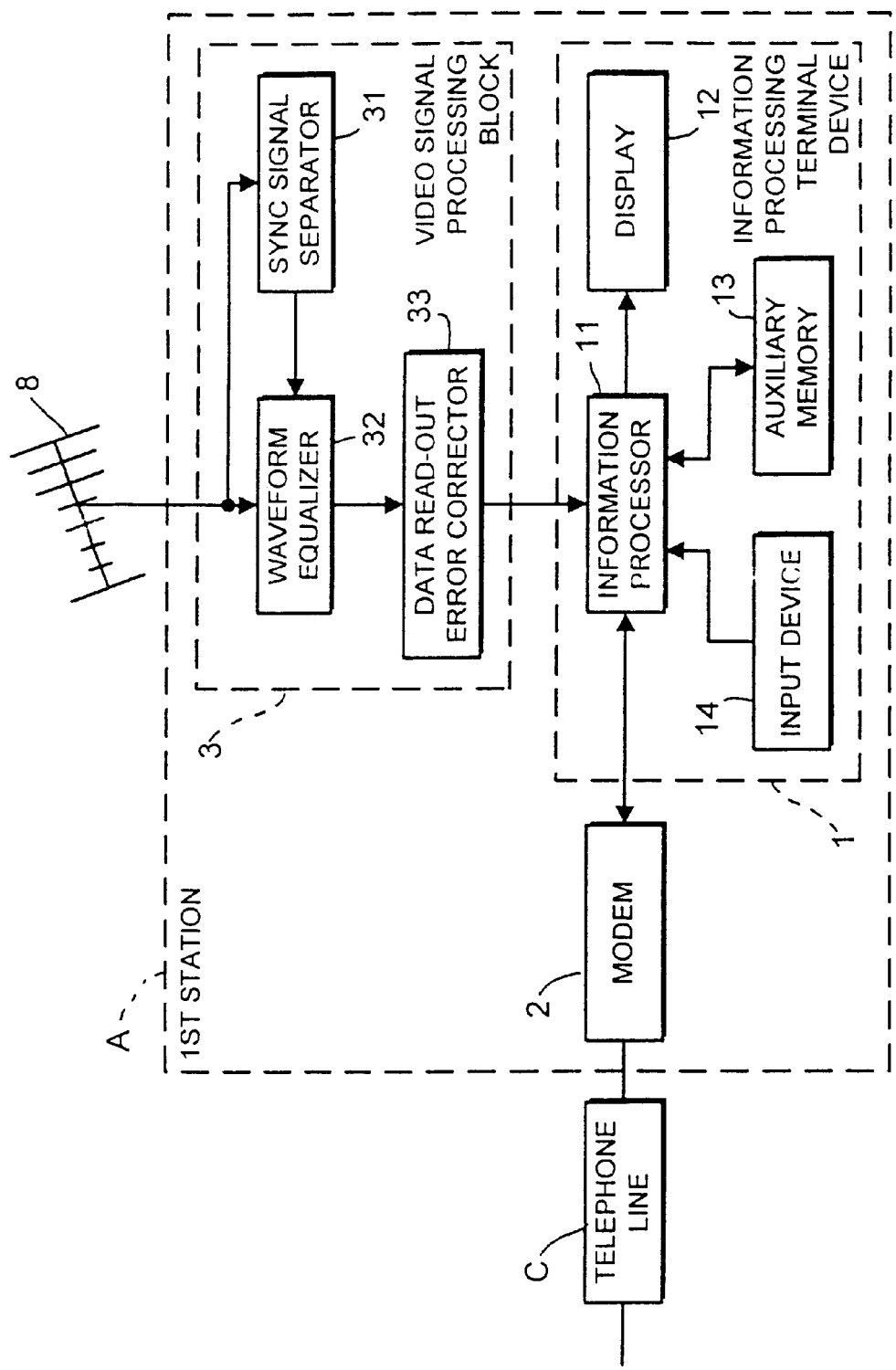
FIG. 15 is a diagram showing an arrangement of a conventional information processing terminal apparatus I, as shown in FIG. 12.

FIG. 1 is a functional block diagram showing a principal portion of the information service receiving apparatus according to the present invention. FIG. 15 also maintains elements with the same reference numerals.

In FIG. 1, a numeral 100 denotes an information service receiving apparatus according to the present invention. The information service receiving apparatus 100 includes a video signal processing block 3 and an information processing block 101.

Figure 12:
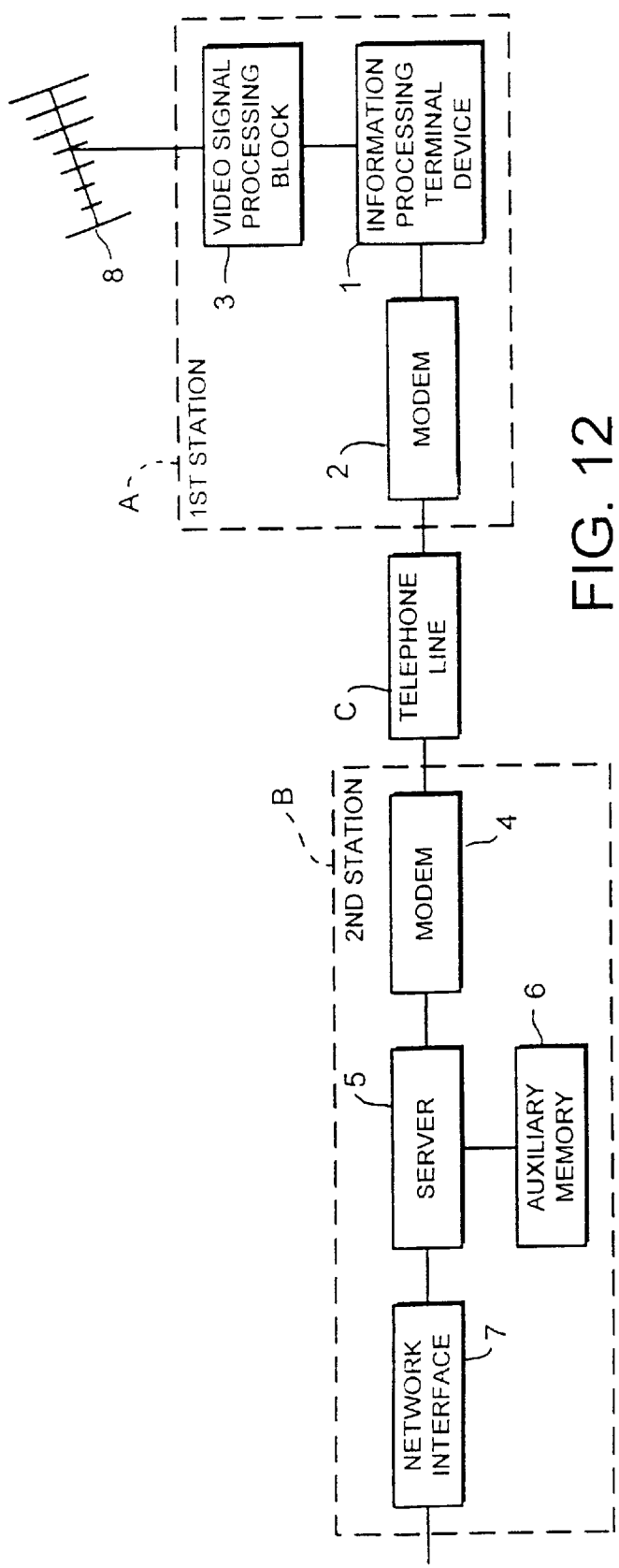
FIG. 12 is a schematic diagram showing an arrangement of the two-way service using a server.

The information processing block 101 connects through a modem 2 to interface with a station (not shown; correspond to the second station B in FIG. 12) which is provided with, e, g., servers, via a telephone line C coupled to the station. The video signal processing block 3 is connected to an antenna 8 for receiving TV broadcast ground waves.

The video signal processing block 3 includes a sync signal separator 31, a waveform equalizer 32, and a data read-out error corrector 33.

The sync signal separator 31 separates sync signals from the video signal input from the antenna 8 to generate timing signals that determine the line numbers of the sync signals. The sync signal separator 31 then supplies the generated timing signals to the waveform equalizer 32.

Figure 14:
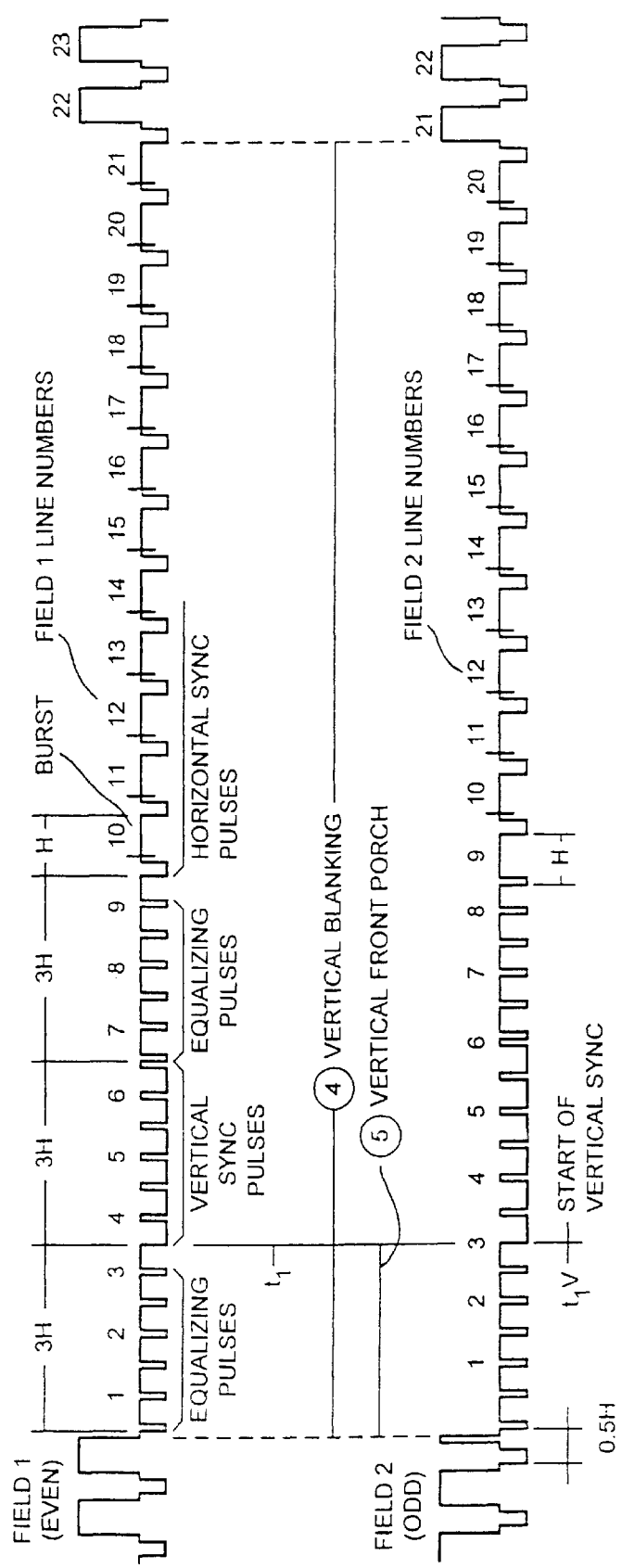
FIG. 14 is a diagram showing the magnified waveform of the vertical sync period of the video signal.

The waveform equalizer 32 eliminates ghost signals in the video signal received from the antenna 8 and then extracts data carried on vertical sync signals, as shown in FIG. 14, at timings responsive to the timing signals supplied by the sync signal separator 31. Then, the waveform equalizer 32 supplies the extracted data to the data read-out error corrector 33. The data read-out error corrector 33 carries out an error correction for the data supplied from the waveform equalizer 32. Then, the data read-out error corrector 33 supplies the error-corrected data to the information processing block 101.

The information processing block 101 has a display 12, an auxiliary memory 13, an input device 14, a memory card Interface 15, an information filter 16 and an information processor 17. The display 12, the auxiliary memory 13, the input devise 14, the memory card interface 15, and the information filter 16 are respectively connected to the information processor 17. And, the modem 2 is also connected to the information processor 17.

The display 12 has a CRT or LCD and it displays several pictures to be presented for users under the control of the information processor 17.

The auxiliary memory 13 stores the information such as OS for the basic control of the information processor 17.

The input device 14 in the form of, e.g., a keyboard or a touch-panel, is provided for the user to enter several instructions into the information processor 17.

The memory card interface 15 is provided for writing information to or reading information from the memory card 9 under the control of the information processor 17, when the removable memory card 9 is inserted in the information service receiving apparatus 1ea.

The information filter 16 receives the data output from the video signal processing block 3. The information filter 16 extracts the information corresponding to a keyword supplied by the information processor 17 among the data output from the video signal processor 3 and supplies it to the information processor 17.

The information processing 17, which has, e.g., a microcomputer as a main control unit, accesses several information services to present data to the users. The information processor 17 has a card managing information reader 17a, a data extractor 17b, and a data writer 17c, in addition to a basic processing functions for, e.g., receiving the several information providing service.

Here, the card managing information reader 17a read outs the card managing information from the inserted memory card 9. The data extractor 17b controls the Information filter 16 so as to extract the data corresponding to the keyword contained in the card managing information which is read out from the memory card 9 by the card managing information reader 17a. Then, the data writer 17c writes the data received via the modem 2 or the information filter 16 in the memory card 9.

Figure 2:
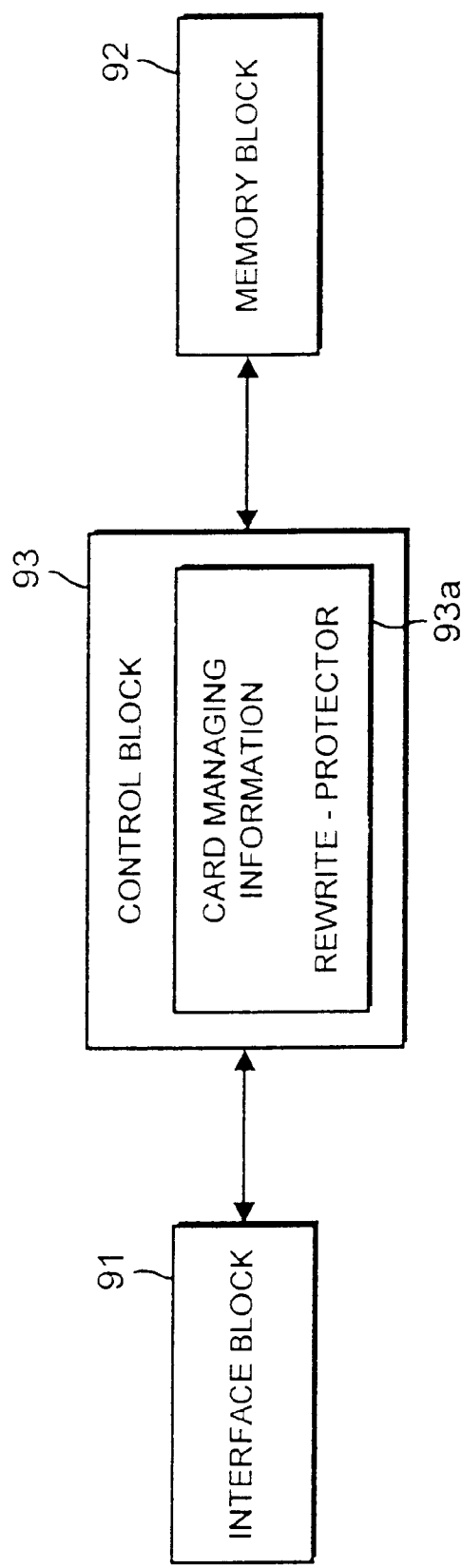
FIG. 2 is a functional block diagram showing an arrangement of the memory card which is suitable for information service receiving apparatus 100, as shown in FIG. 1.

FIG. 2 is a functional block diagram showing an arrangement of a memory card 9 which is suitable for adapting to the information service receiving apparatus 100 according to the embodiment of the present invention. As shown In FIG. 2, the memory card 9 has an interface block 91, a memory block 92, and a control block 93. The interface block 91 and the memory block 92 are respectively connected to the control block 93.

The interface block 91 exchanges data between the memory card interface 15 under as commanded by the control block 93.

Figure 3:
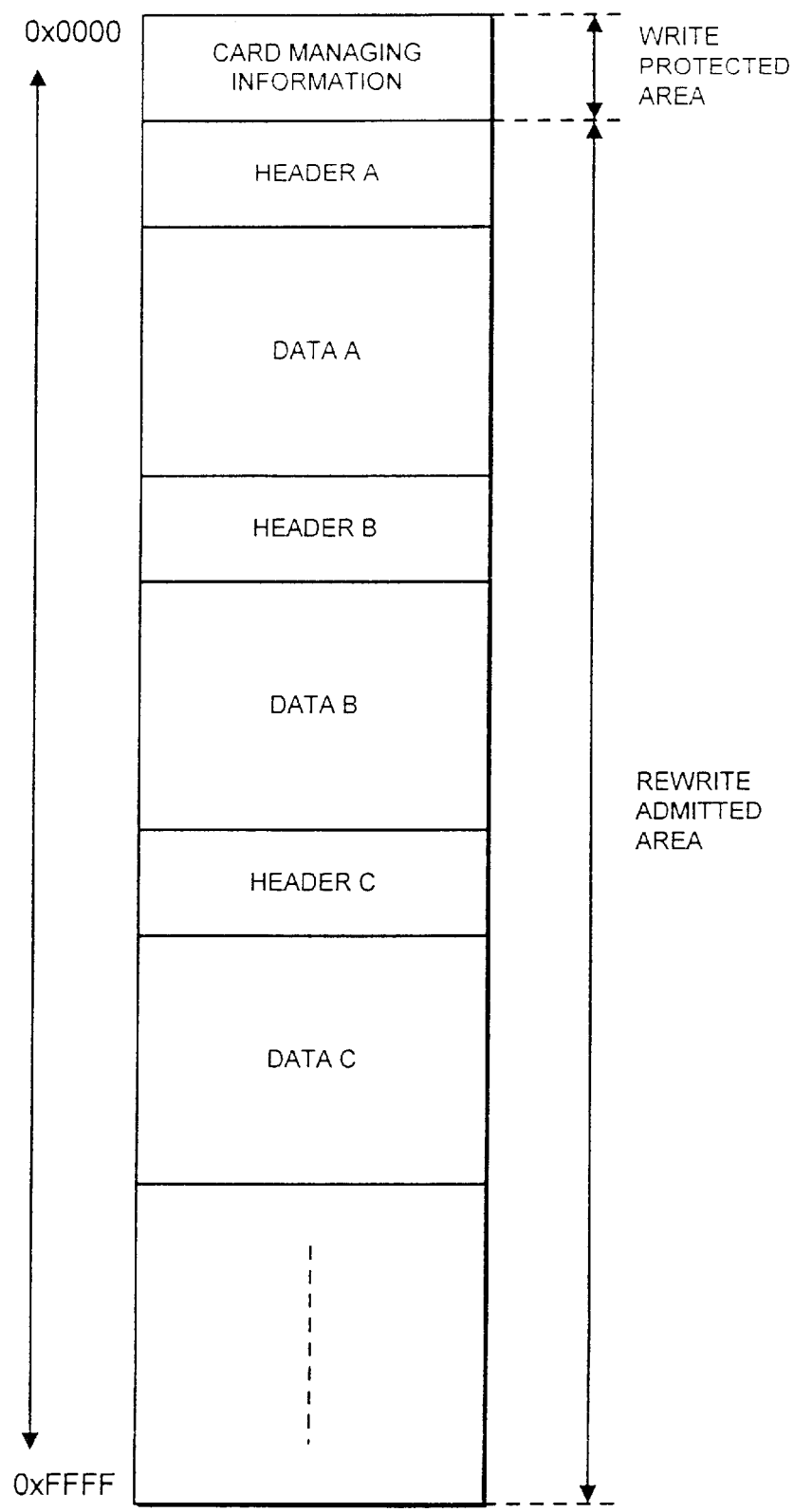
FIG. 3 is a schematic diagram showing a memory map of the memory block 92, as shown in FIG. 2.
Figure 4:
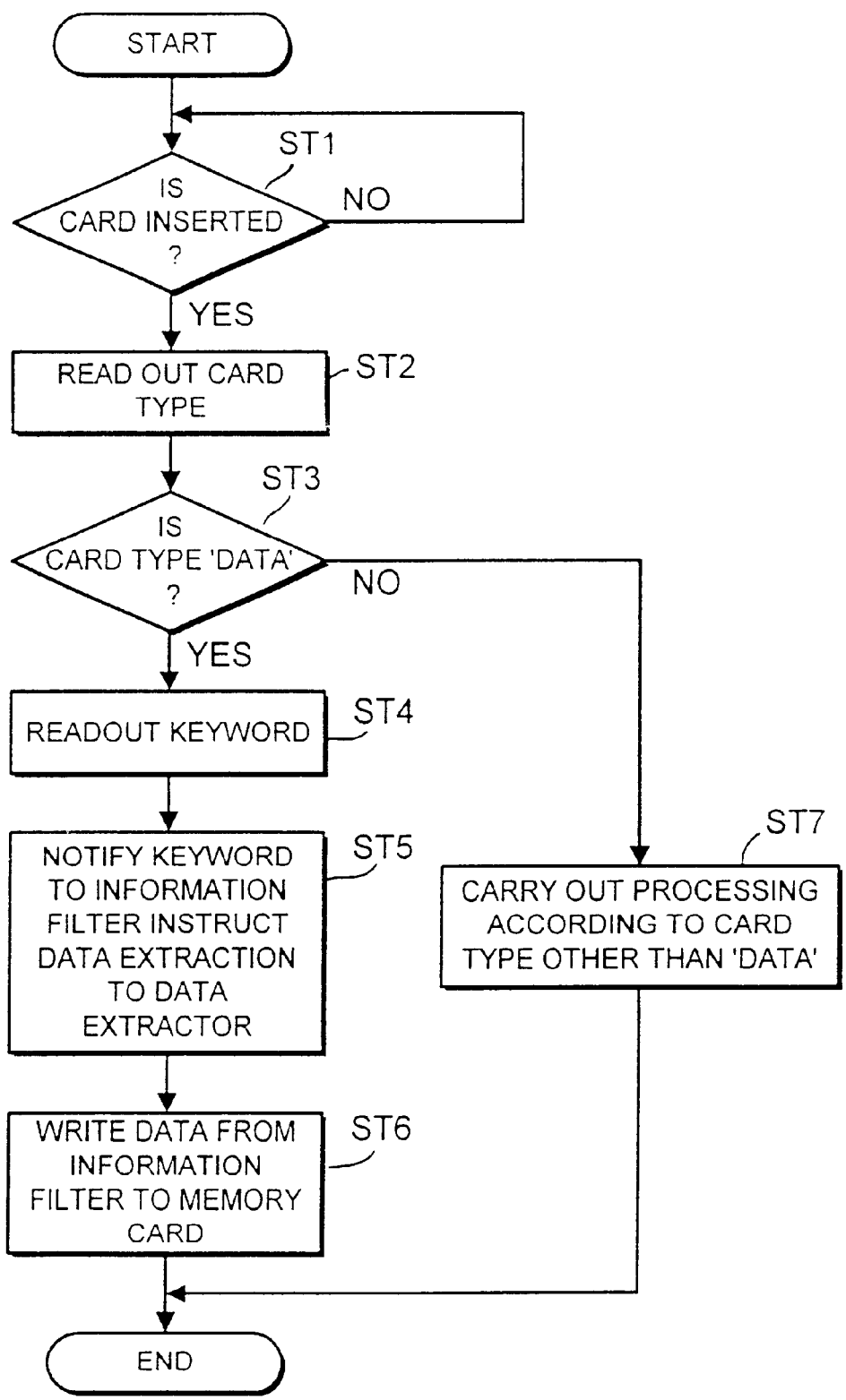
FIG. 4 is a flow chart showing the processing procedure of the information processing apparatus, as shown in FIG. 1.

The memory block 92, which has, e.g., a physical device such as a flash ROM, a NAND-EEPROM and the like, stores the card managing information or the data received via the modem 2 or the information filter 16. The memory block 92 has a memory map as shown in FIG. 3. That is, the memory block 92 has two areas for storing the card managing information and for writing the data received via the modem 2 or the information filter 16. The area for writing the data received via the modem 2 or the information filter 16 is divided further to the two areas for respectively writing several data and for writing the headers of the respective data (record date, data size or data name).

The control block 93 writes the data received by the interface block 91 into the memory block 92 or output the data preserved in the memory 92 via the Interface block 91 The control block 93, which has for Instance the main control unit as the microcomputer, has a card managing information rewrite-protector 93a in addition to a well-known general control unit in the memory card controller as described above.

The card managing information rewrite-protector 93a protects rewritings over the card managing information preserved in the memory block 92 as long as there is no specific rewrite-unprotect instruction. Accordingly, to the card managing information rewrite-protector 93a in the memory block 92 at the normal condition as, as shown in FIG. 3, the area storing the card managing information is a rewrite-protected area, and the area for writing the data received via the modem 2 or the Information filter 16 Is a rewrite-admitting area.

Next, the operation of the information receiving apparatus 100 constructed as described above will be explained according to the processing order of the information processor 17.

First, in the waiting state the information processor 17 waits the memory card 9 to be inserted (step ST1). When the memory card 9 has been inserted, the information processor 17 read outs the card type information among the card managing information presto red in the memory card 9 by the card managing information reader 17a (step ST2).

Here In this embodiment the card managing information prestored in the memory card 9 is the total capacity of memories a manufacturer's name (or vender's name, service provider s name), keywords and card types. For Instance this type of information have been preset as described below;

Capacity: 4 M-bytes
Vender: 000 Business Co.
keyword: "politics"
Type: data

The keyword shows the types of data rewrite-admitted into the memory card 9. For instance, if the keyword; "politics" has been preset as described above, the writable data must be related to the "politics". As the keyword other than the "politics" for instance "sports", "weather", "travel", "traffic information", "telephone number" or "IURL (Uniform Resource Locator) presenting HTTP protocol addresses" may be imagined. Besides them, any given keyword can be set. For instance, if the program codes individually set to the several programs by the information service provider as a keyword the writable data can be set at each program unit.

The card type shows the usage of the memory card 9. For instance, if the "data" has been preset for a card type as described above, it is indicated that the card Is admitted to write any given data. As such a card type other than the "data", f instance, "E-mall", "image", "photo", "music", "movie", etc can be imagined. Besides them any other type of card can be set.

After reading out the card type in the step ST2 the information processor 17 determines that the read out card type is "data" or not (step ST3). Then, if the card type is the "data" the Information processor 17 reads in the keyword information out of the memory card 9 by the card managing information reader 17a (step ST4). The information processor 17 then notifies the information filter 16 of the read-out keyword to instruct the data extractor 17b a data extraction (step ST5).

By receiving this notification, the information filter 16 extracts the data related to the notified keyword from the data (received data) supplied from the video signal processing block 3 and supplies them to the information processor 17. Here, the data extraction processing in the Information filter 16 is the well-known processing such as to detect the several preset character strings related to the keyword among the received data and to extract the data containing the character strings more than a specific rate.

The information processor 17 writes in only the data which are extracted by the information filter 16 by the data writer 17c (step ST6). Here, as to the memory card 9, the control block 93 writes the data supplied from the information processor 17 in the rewrite-admitting area of the memory block 92 in the form of character data, based on instructions from the information processor 17.

Here, if the card type of the inserted memory card 9 is other than "data", the information processor 17 carries out the well-known processing according to the card type (step ST7). Concretely, when the card type is "photo", it caries out the extending process to the photo data stored in the memory card 9 and displays the photo in the display 12.

According to the present invention as mentioned above, when the memory card in which "data" is the preset card type is inserted, only the data relating to the keyword preset in the memory card 9 is extracted from the data supplied by the teletext automatically and stored in the memory card 9. Accordingly, the user can obtain the desired data without involving complicated instructing operations upon inserting the memory card in which a keyword associated to the desired data has been preset in the information service receiving apparatus 100 of the present embodiment.

On the other hand, from the view of the service provider, the user of the information service receiving apparatus 100 of the present embodiment can limit the data which is acquirable in the memory card 9. Accordingly, by adding the information service charge to the sales price or the rental fee of the memory card 9, it is possible to subscript the information service using teletext.

Accordingly, when the information service is cost it is feared that the data will be retrieved illegally if an unauthorized user tampers with the card managing information in the memory card 9. However, according to this embodiment In the control block 93 of the memory card 9 the card managing information rewrite-protector 93a prohibits the rewriting of the memory space of the card managing information in the memory block 92 so as to prevent tampering with the card managing information and retrieving data illegally.

Here, it is possible to prevent unauthorized access to the card managing information by establishing another memory area (ROM area, for only reading out and storing the card managing information in this ROM area. However, although in this embodiment the card managing information rewrite-protector 93a protects rewriting the memory space for the card managing information in the memory block 92 in normal times, since it releases the rewrite-protect of the card managing information when there is a specific rewrite-unprotect instruction (e.g., lock codes) the service provider can recycle the memory card 9 to rewrite the card information for taking place a form of providing services such as re-sales or re-rents.

Figure 5:
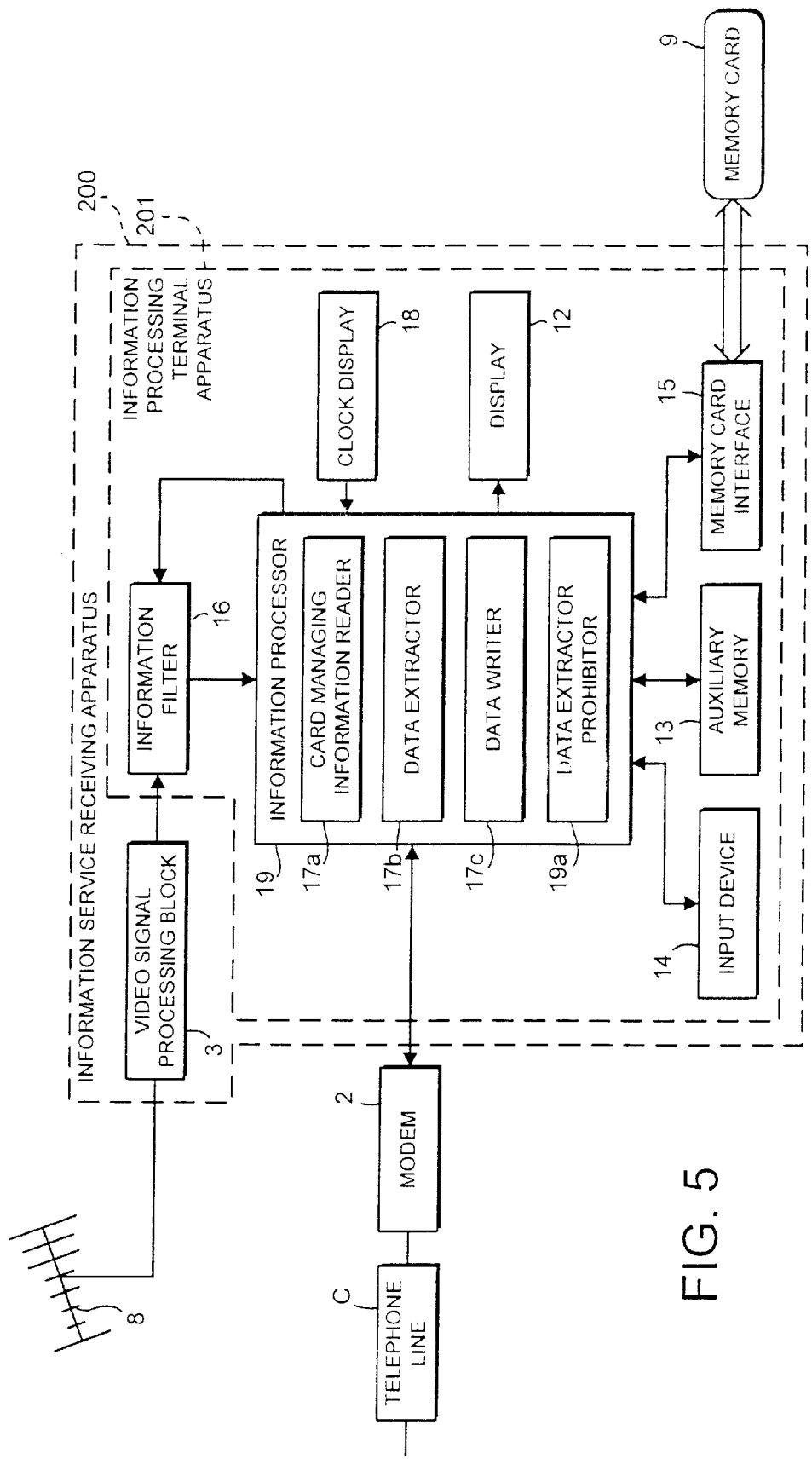
FIG. 5 is a functional block diagram showing a principal portion of the information service receiving apparatus according to the second embodiment of the present invention.

FIG. 5 is a functional block diagram showing a principal portion of the information service receiving apparatus according to the second embodiment of the present invention. Here, the components as found in FIGS. 1 and 15 are assigned the same reference numerals.

In FIG. 5, the reference numeral 200 denotes the information service receiving apparatus according to the present embodiment. The information service receiving apparatus 200 is comprised of the video signal processing block 3 and an information processing terminal apparatus 201.

The information terminal apparatus 201 is connected to a modem 2 for communicating with stations installing servers (not shown; correspond to the second station B in FIG. 12) via a telephone line C which is connected to the same station. The video signal processing block 3 is connected to an antenna 8 for receiving TV ground waves.

That is, the information service receiving apparatus 200 of the present embodiment has the information processing terminal apparatus 201 instead of the information processing block 101 in the information service receiving apparatus 100 of the first embodiment.

The information processing block 201 has a display 12, an auxiliary memory 13, an Input device 14 a memory card Interface 15, an information filter 16, a clock device 18 and an information processor 19. The display 12, the auxiliary memory 13, the input device 14, the memory card interface 15, the information filter 16, and the clock device 18 are respectively connected to the information processor 19 And the modem 2 is also connected to the information processor 19.

That is, the information processing terminal apparatus 201 in the present embodiment has the information processor 19 instead of the information processor 17 in the information processing block 101 of the first embodiment. In addition it has a clock device 18.

The display 12 has a CRT or LCD and it displays several pictures to be presented for users under the control of the information processor 19.

The auxiliary memory 13 stores the information such as an OS for basic control of the information processor 19.

The input device 14 In the form of, e.g., a keyboard or a touch panel, is provided for user to enter several Instructions to the information processor 19.

The memory card interface 15 writes the information in the memory card 9 and reads the information out of the memory card 9 under the control of the information processor 19 when the removable memory card 9 is inserted in the information service receiving apparatus 100.

The information filter 16 receives data outputted from the video signal processing block 3 The information filter 16 extracts the information corresponding to the keyword designated by the information processor 19 among the data output from the video signal processing block 3 and supplies it to the information processor 19. The clock device 18 performs a clock operation to present the current clock information to the information processor 19.

The information processor 19, which has a microcomputer for instance as a main control unit, accesses several information providing services and shows the data to the user. The information processor 19 has a card managing information reader 17a, a data extractor 17b, a data writer 17c, and a data extraction prohibitor 19a in addition to the basic processing function for, e.g., receiving the several information providing service. That is, the information processor 19 in the present embodiment has the data extraction prohibitor 19a in addition to each processing unit in the information processor 17 of the first embodiment.

Here, the data extraction prohibitor 19a prohibits the data extraction process by the data extractor 17b when the current clock information presented by the clock device 18 had been over the card deadline contained in the card managing information read out of the memory card 9 by the card managing information reader 17a.

Figure 6:
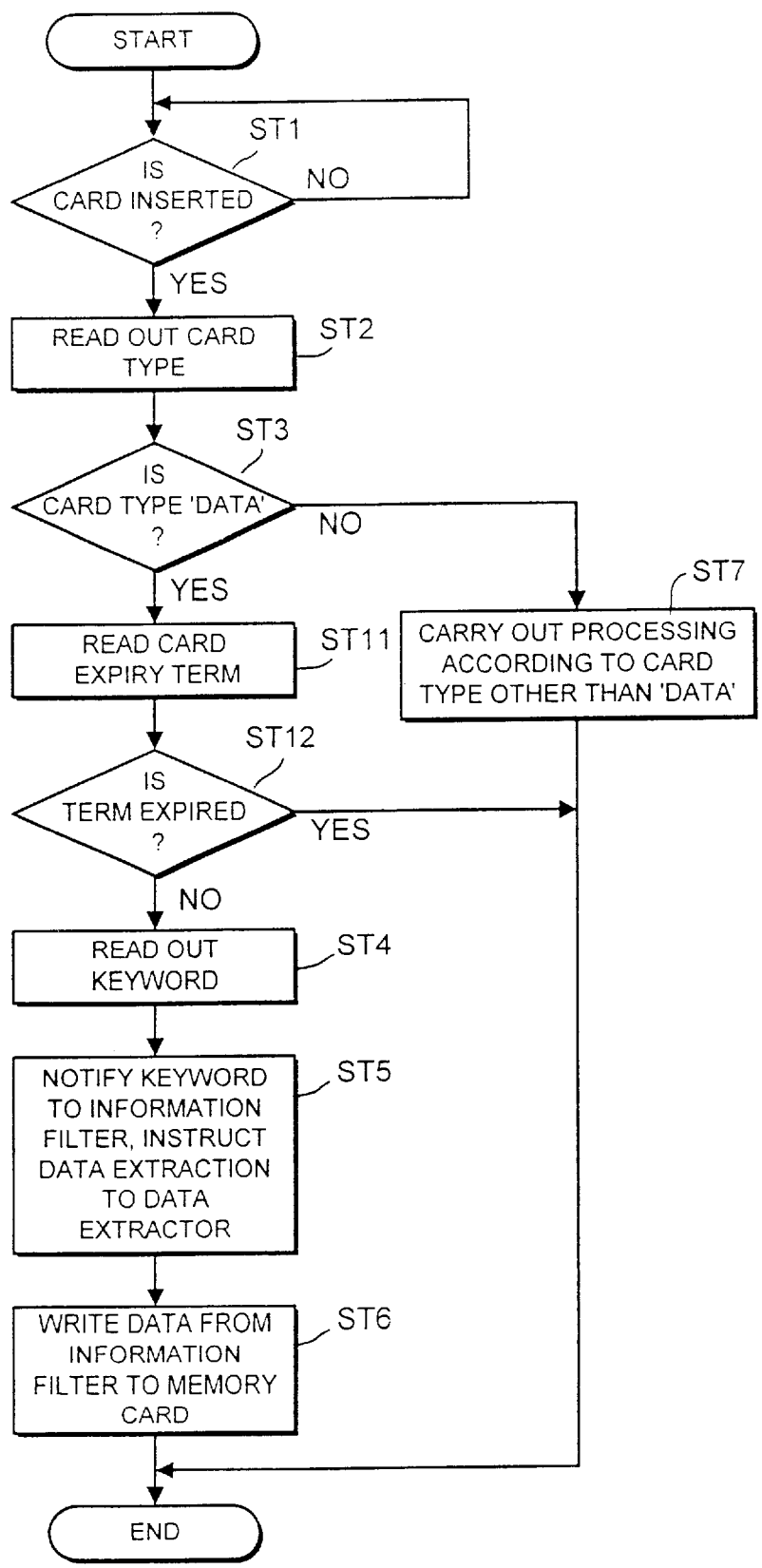
FIG. 6 is a flow chart showing the processing procedure of the information processor 19, as shown in FIG. 5.

Next, the operation of the information service receiving apparatus 200 constructed as mentioned above will be explained according to the process order of the information processor 19, as shown in FIG. 6.

First, the information processor 19 performs the steps ST1 through ST3 and step ST7 as the same way of the information processor 17 in the first embodiment. Upon determining that the card type is "data" in step ST3, the information processor 19 reads the information about card expiration term out of the memory card 9 via the card managing information reader 17a (step ST11). Then, the information processor 19 compares the card expiration term read out at the step ST11 with the current clock information presented by the clock device 18 in the data extraction prohibitor 19a to determine whether the card is expired or not (step ST12).

Here, the card managing information presto red in the memory card 9 contains the capacity of all memories, manufacturer's name (or vender's name, service provider's name), keywords, card types and card expiry terms. Here the type of information has been preset as described below;

Capacity: 4 M bytes
Vender: XXX Business Co.
Keyword: "politics"
Type: data
Expiry date: 1996-12

The card expiration term presents that data can be written onto the memory card 9. In the above embodiment the card expiration term shows that data can be written into the memory card 9 until the end of December 1996. Here the card expiration term may be set at the level of date or time. Or the card expiration term may be set in the form such as "from October 9th to December 22nd" or "throughout October".

When the current clock information presented by the clock device 18 is within the card expiration term read out in step ST11, the information processor 19 determines that the card has not lapsed in the step ST12. From then on operations of the steps ST4 through ST6 are performed in the same manner as those performed by the information processor 17 in the first embodiment.

However, if the current clock information presented by the clock device 18 exceeds the card expiration term read out in step ST11, the information processor 19 determines that the term is expired in step ST12. At this time the information processor 19 ends a series of processing without processing step ST4 through step ST6. That is, the information processor 19 rejects writing the data in the memory card 9.

According to the present embodiment as described above, it can obtain the same effects as those in the first embodiment.

Furthermore, according to the present embodiment, since it rejects writing data into the inserted memory card 9 if the memory expiration term of the memory card 9 is other than the preset expiration term, the service provider can be limited within a fixed term.

Figure 7:
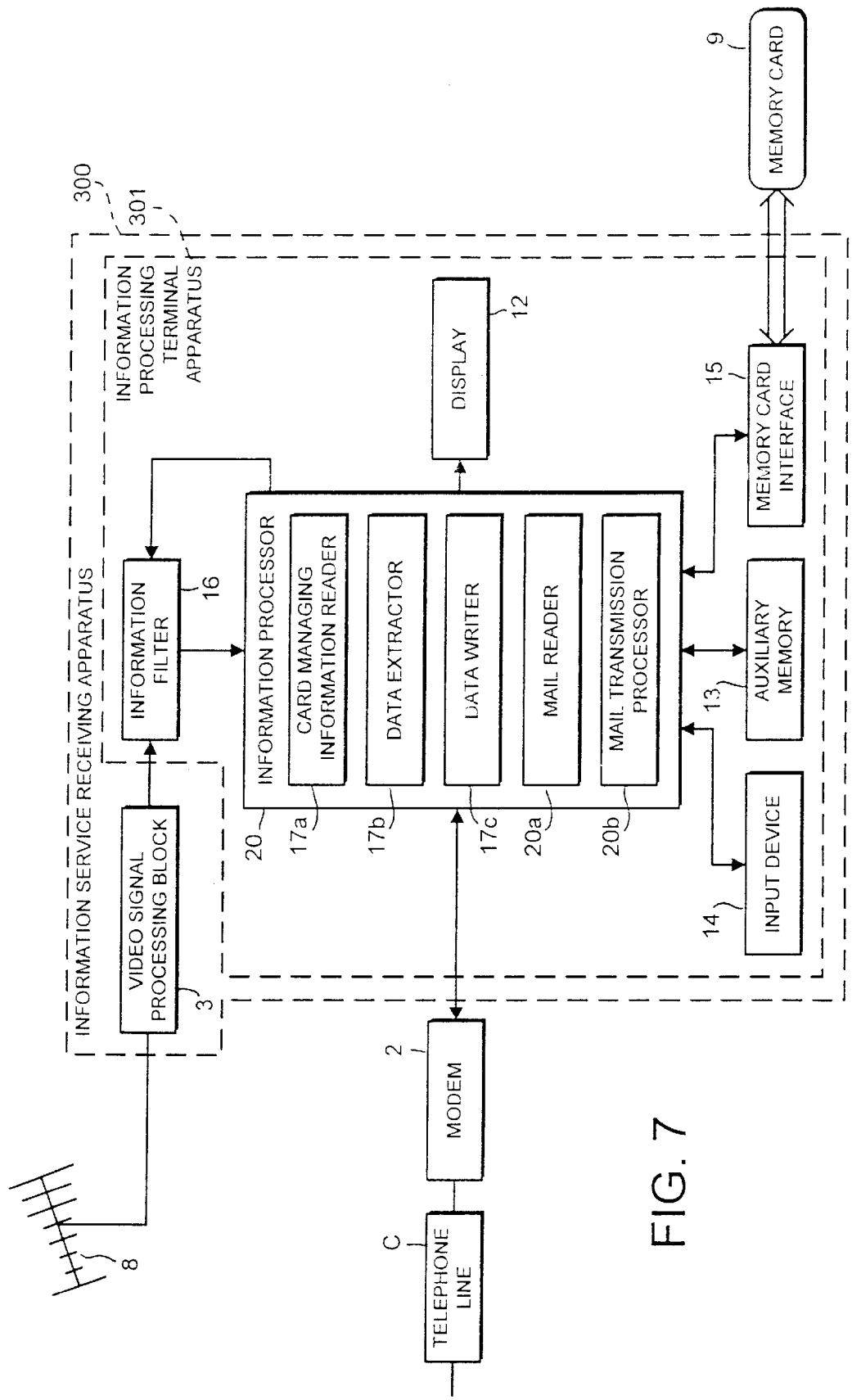
FIG. 7 is a functional block diagram showing a principal portion of the information service receiving apparatus according to the third embodiment of the present invention.

FIG. 7 is a functional block diagram showing a principal portion of the service receiving apparatus according to the third embodiment of the present invention. Here, the same components as found in FIGS. 1 and 15 are assigned with the same reference numerals.

In FIG. 7, the reference numeral 300 denotes the information service receiving apparatus according to the present embodiment. The Information service receiving apparatus 300 is comprised of the video signal processing block 3 and the information processing terminal apparatus 301.

The information processing terminal apparatus 301 is connected to a modem 2 for communicating with stations installing servers (not shown: correspond to the second station B in FIG. 12) via a telephone line C which is connected to the same station. The video signal processor 3 is connected to an antenna 8 for receiving TV ground waves.

That is, the information service receiving apparatus 300 of the present embodiment has the information processing terminal apparatus 301 instead of the information processing block 101 in the information service receiving apparatus 100 of the first embodiment.

The information processing terminal apparatus 301 has a display 12, an auxiliary memory 13, an input device 14, a memory card interface 15, an information filter 16 and an information processor 20. The display 12, the auxiliary device 13, the auxiliary input device 14, the memory card interface 15 and the information filter 16 are respectively connected to the information processor 20. And, the modern 2 is also connected to the information processor 20.

That is, the information processing terminal apparatus 301 in the present embodiment has the information processor 20 instead of the information processor 17 in the information processing block 101 of the first embodiment.

The display 12 has a CRT or LCD and it displays several pictures or images to users under the control of the information processor 20.

The auxiliary memory 13 stores the information such as OS for basis control of the information processor 20.

The input device 14 in the form of, e.g., a keyboard or a touch-panel, is provided for user to enter several instructions to the information processing devise 20.

The memory card interface 15 writes information in the memory card 9 and reads the information out of the memory card 9 under the control of the information processor 20 when the removable memory card 9 is inserted in the information service receiving apparatus 300.

The information filter 16 receives data outputted from the video signal processing block 3. The information filter 16 extracts the information corresponding to the keyword designated by the information processor 20 among the data output from the video signal processing block 3 and supplies it to the information processor 20.

The information processor 20, which has a microcomputer for instance as a main control unit, accesses to the several information services and shows the data to the user. The information processor 20 has a card managing information reader 17a, a data extractor 17b, a data writer 17c, a mail reader 20a, and a mail transmission processor 20b in addition to the basic processing function for receiving, e.g., several types of information providing services. That is, the information processor 20 in the present embodiment has the mail reader 20a and the mail transmission processor 20b in addition to each processing unit in the information processor 17 of the first embodiment.

Here, the mail reader 20a reads out the E-mail data stored in the memory card 9. The mail transmission processor 20b transmits the E-mail data read out by the mail reader 20a.

Figure 8:
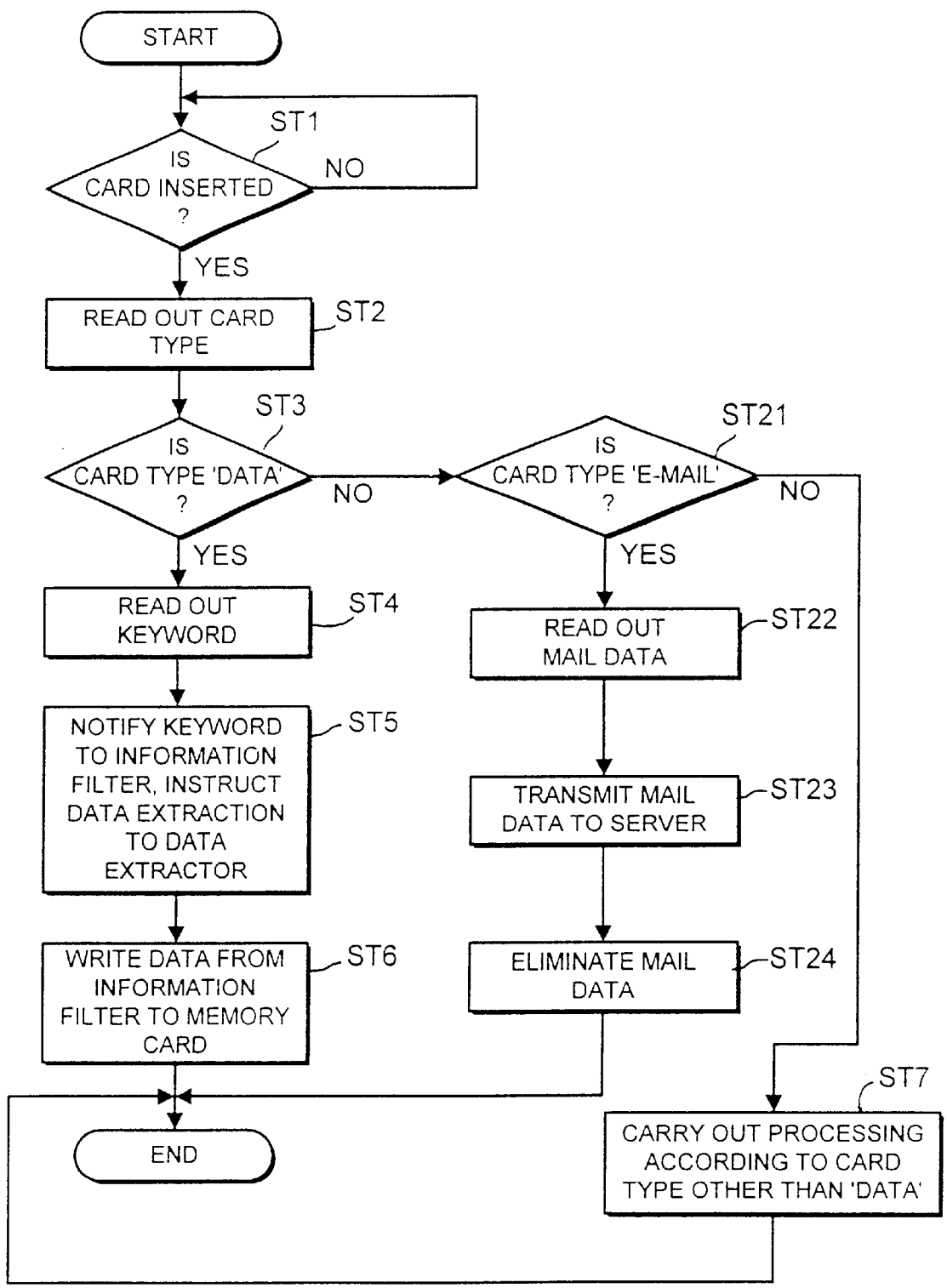
FIG. 8 is a flow chart showing the processing procedure of the Information processor 20 as shown in FIG. 7.
Figure 9:
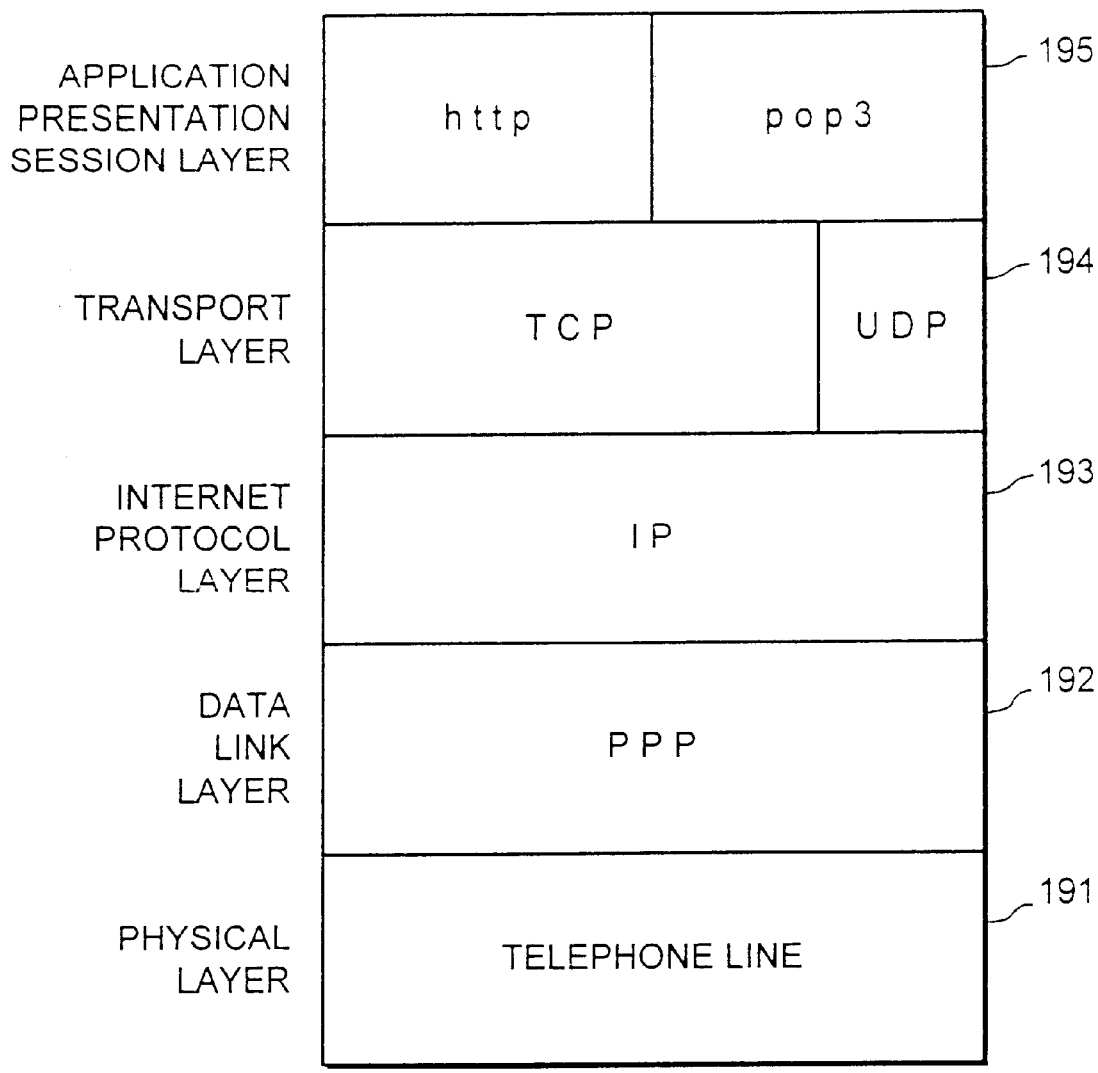
FIG. 9 is a diagram showing a software model in the case of using the POP 3 as an example of the E-mail transmission protocol.

Next, the operation of the information service receiving apparatus 300 constructed as mentioned above will be explained according to the process order of the information processor 20, as shown in FIG. 8.

First, the information processor 20 performs the steps ST1 through ST6 as the same way of the information processor 17 in the first embodiment.

However, upon determining that the card type is not "data" in the step ST3 the information processor 20 determines whether the card type is "E-mail" or not (step ST21) so as to perform the processing according to the card type in the step ST7. When the card type is not "E-mail" either, the information processor 20 performs the processing of step ST7 as the same way as that of the information processor 17 in the first embodiment.

On the other hand, the card type is "E-mail" the information processor 20 reads in the E-mail data stored in the memory card 9 by the mail reader 20a (step ST22) so as to transmit the E-mail data to a server installed in the specific service provider (for instance INTERNET provider) via the modem 2 and the telephone line C, according to the prescribed protocol (step ST23). Here, the telephone number for connecting to the service provider or the account has been preset in the information processor 20. And, the address of the E-mail data has been stored in the memory card 9 together with the E-mail data.

Figure 13:
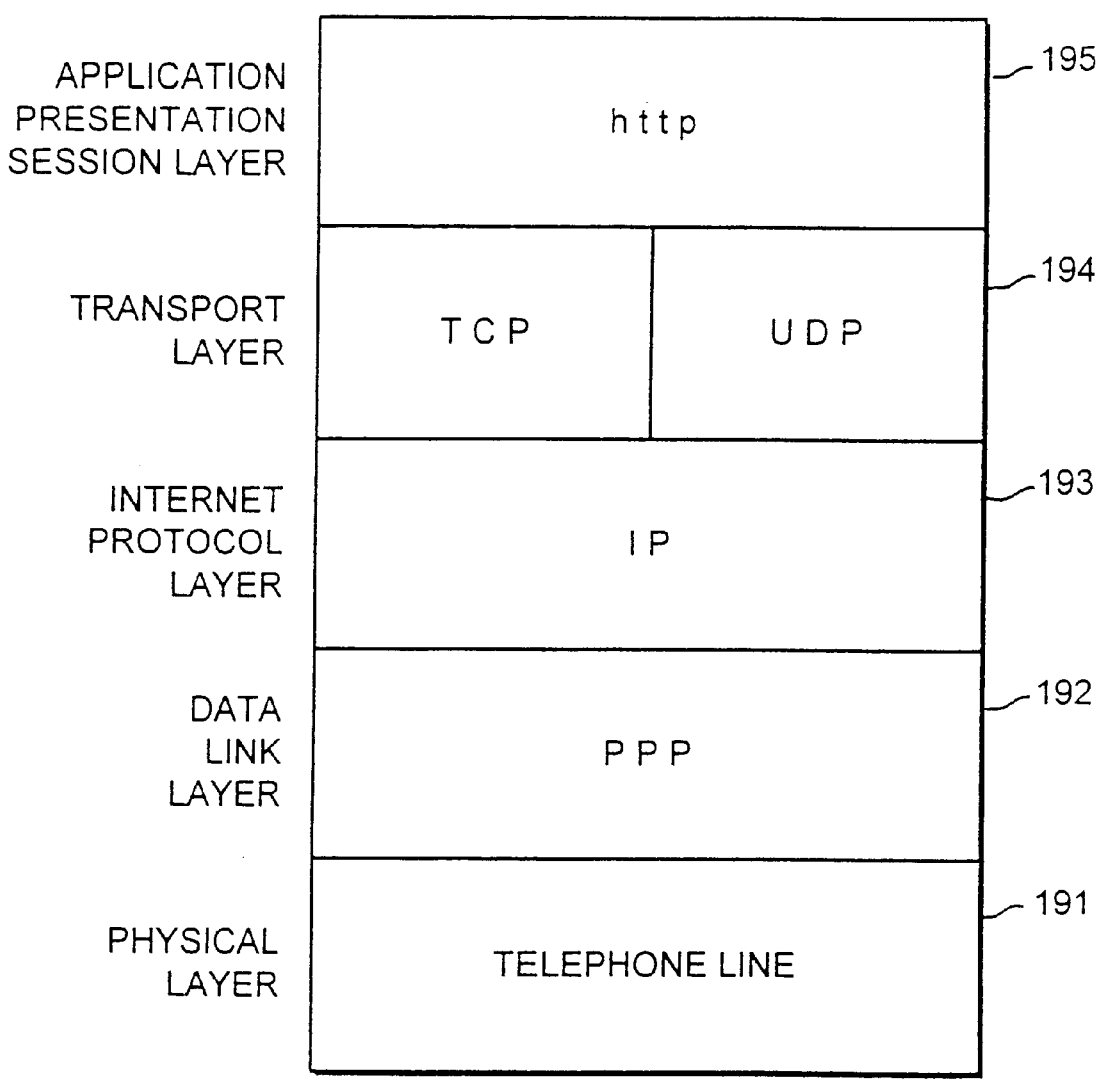
FIG. 13 is a diagram showing the OSI reference model of the protocol in the system, as shown in FIG. 12.

As the protocol for realizing the E-mail on the TOP/Ip there are a SMTP (Simple Mail Transfer Protocol; see REC 821) or POP3 ("Post Office Protocol"; see FECS 1081, 1082). Here, the software model using the POP3 will be shown in FIG. 9. This is added with the POP3 to the layer 195 which corresponds to the OSI reference model session layer, the presentation layer, and the application layer, in comparison to those, as shown in FIG. 13.

When completing the E-mail data transmission, the information processor 20 eliminates the E-mail data whose transmission was completed from the memory card 9 (step ST24). Here, the processes of steps ST23 and ST24 are performed by the mail transmission processor 20b.

According to the present embodiment as described above, it can obtain the same effects as those in the first embodiment.

Furthermore, according to the present embodiment, when the memory card 9 wherein with "E-mail" preset as a card type is inserted, the E-mail data stored in the memory card 9 is transmitted to the server installed in the specific service provider automatically. The user inserts the memory card 9 (a card preset therein "E-mail" as a card type)in which E-mail data made by any given means (for Instance, by using the information device such as a personal computer) has been stored to the information service receiving apparatus 300 of the present embodiment so as to transmit the E-mail without the complicated operation for transmitting the E-mail data.

Figure 10:
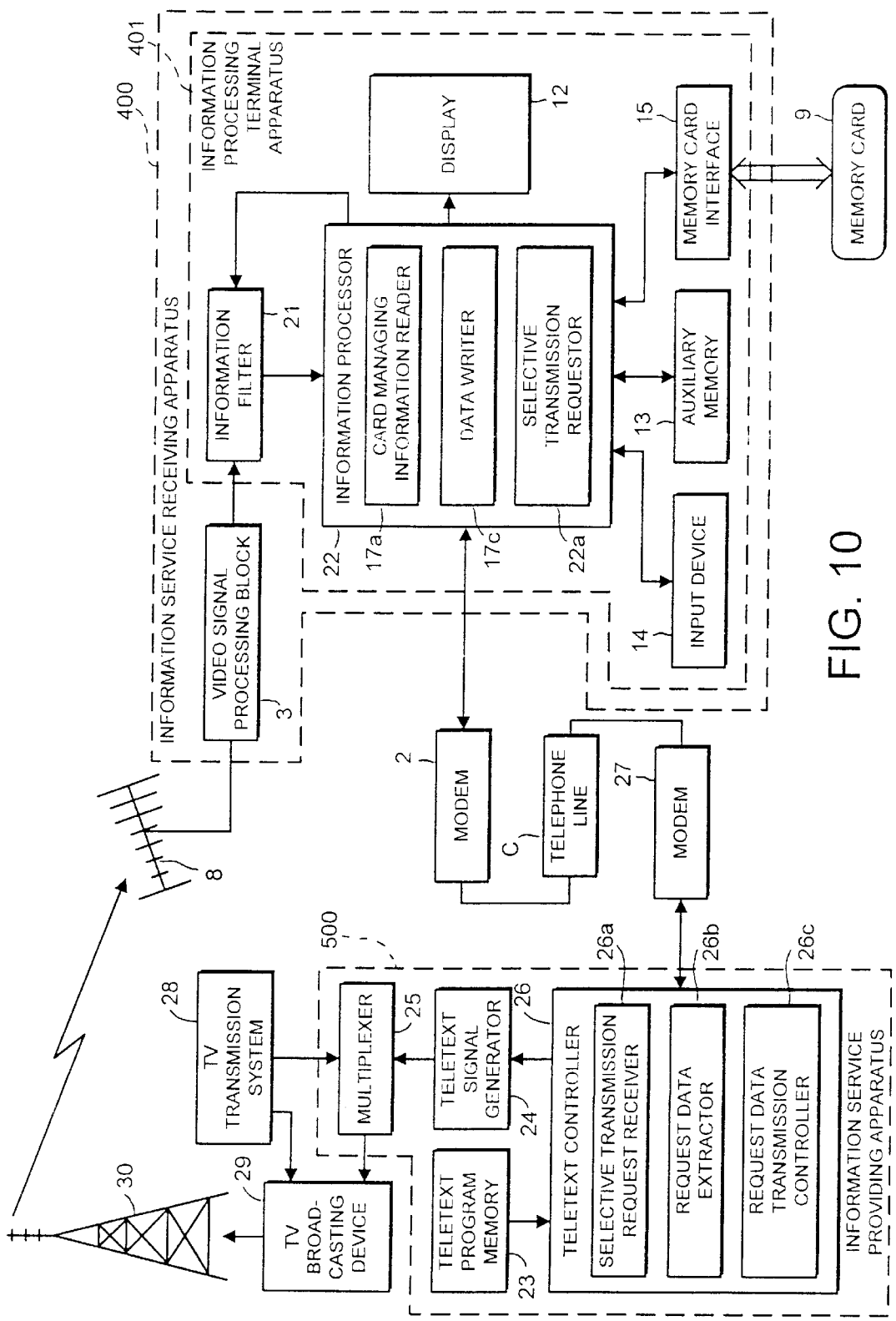
FIG. 10 is a functional block diagram showing a principal portion of the information service system according to the forth embodiment of the present invention.

FIG. 10 is a functional block diagram showing a principal portion of the information service system according to the forth embodiment of the present invention. Here, components the same as those shown in FIGS. 1 and 15 are assigned with the same reference numerals.

This information service system is comprised of mainly an information service receiving apparatus 400 and an information service providing apparatus 500. The information service receiving apparatus 400 Is located In general homes, while the information service providing apparatus 500 is located in, e.g., teletext providers.

The information service apparatus 40C is comprised of the video signal processing block 3 and the information processing terminal apparatus 401.

The information processing terminal apparatus 401 is connected to a modem 2 for communicating to the information service providing apparatus 500 via the telephone line C. And, the antenna 8 for receiving the TV ground wave is connected to the video signal processing block 3.

That is, the information service receiving apparatus 400 of this embodiment has the Information processing terminal apparatus 401 instead of the information processing block 101 in the information service receiving apparatus 100 of the first embodiment.

The information processing terminal apparatus 401 has a display 12, an auxiliary memory 13, an input device 14, a memory card interface 15, an Information filter 21 and an information processor 22. The display 12, the auxiliary device 13, the input device 14, the memory card interface 15 and the information filter 21 are each connected to the Information processor 22 to which the modern 2 is also connected.

That is, the information processing terminal 401 of this embodiment has the information filter 21 and the information processor 22 instead of each information filter 16 and the information processor 17 in the information processing block 101 of the first embodiment.

The display 12 has a CRT or LCD for instance, and it displays several pictures or images to users under the control of the information processor 22.

The auxiliary memory 13 stores the information such as an OS for basic control of the information processor 22.

The input device 14 in the form of, e.g., a keyboard or a touch-panel, allows user to enter several instructions to the information processor 22.

The memory card interface 15 writes the information in the memory card 9 and reads the information out of the memory card 9 under the control of the information processor 22 when the removable memory card 9 is inserted into the information service receiving apparatus 400.

The information filter 21 receives data outputted from the video signal processing block 3. When the information processor 22 performs the selective transmission request (which will be mentioned later), the information filter 21 extracts only the data addressed for the information filter 21 out of the data outputted from the video signal processing block 3 and outputs the data to the information processor 22.

The information processor 22, which has a microcomputer, e.g., a main control unit accesses several information providing services and shows the provided data to the user. The information processor 22 has a card managing information reader 17a, a data writer 17c, and a selective transmission requester 22a in addition to the basic processing function for, e.g., receiving the several information providing services. That is, the information processor 22 of this embodiment eliminates the data extractor 17b among each processing unit in the information processor 17 of the first embodiment, and it has a selective transmission requestor 22a.

Here, the selective transmission requester 22a requests the selective transmission of the data relating to the keyword stored in the memory card 9 to the information service providing apparatus 500.

On the other hand, the information service providing apparatus 500 is provided with a teletext program memory 23, a teletext signal generator 24, a multiplexer 25 and a teletext controller 26. A modem 27 for communicating to the information service receiving apparatus 400 via the telephone line C is connected to the teletext controller 26. Further, a TV transmission system 28 and a TV broadcasting device 29 are each connected to the multiplexer 25.

The teletext program memory 23 is to sort the teletext data generated by, for example, the teletext program generating device (not shown).

The teletext signal generator 24 converts the teletext data taken out of the teletext program memory 23 by the teletext controller 26 Into the teletext signal so as to be multiplexed on the TV broadcasting signal.

The multiplexer 25 multiplexes the teletext signal produced by the teletext signal generator 24 on the vertical blanking period in the video signal among the TV broadcasting signals which are supplied to the TV broadcasting device 29 from the TV transmission system 28.

The teletext controller 26, which has a microcomputer for instance, as a main control unit realizes the teletext by taking out the teletext data stored in the teletext program memory 23 and applying them to the teletext signal generator 24. This teletext controller 26 has a selective transmission request receiver 26a, a requested data extractor 26b, and a requested data transmission controller 26c in addition to the well-known general processing unit to realize the teletext.

Among these means, the selective transmission request receiver 26a receives the selective transmission request made by the information service receiving apparatus 400 via the telephone line C. The requested data extractor 26b extracts the data related to the keyword which is supplied by the information service receiving apparatus 400 with the selective transmission request from the data stored in the teletext program memory 23. The requested data transmission controller 26c adds the identification information of the information service receiving 400 which made the selective transmission request to the data extracted by the requested data extractor 26b so as to output the data to the teletext signal generator 24.

Figure 11:
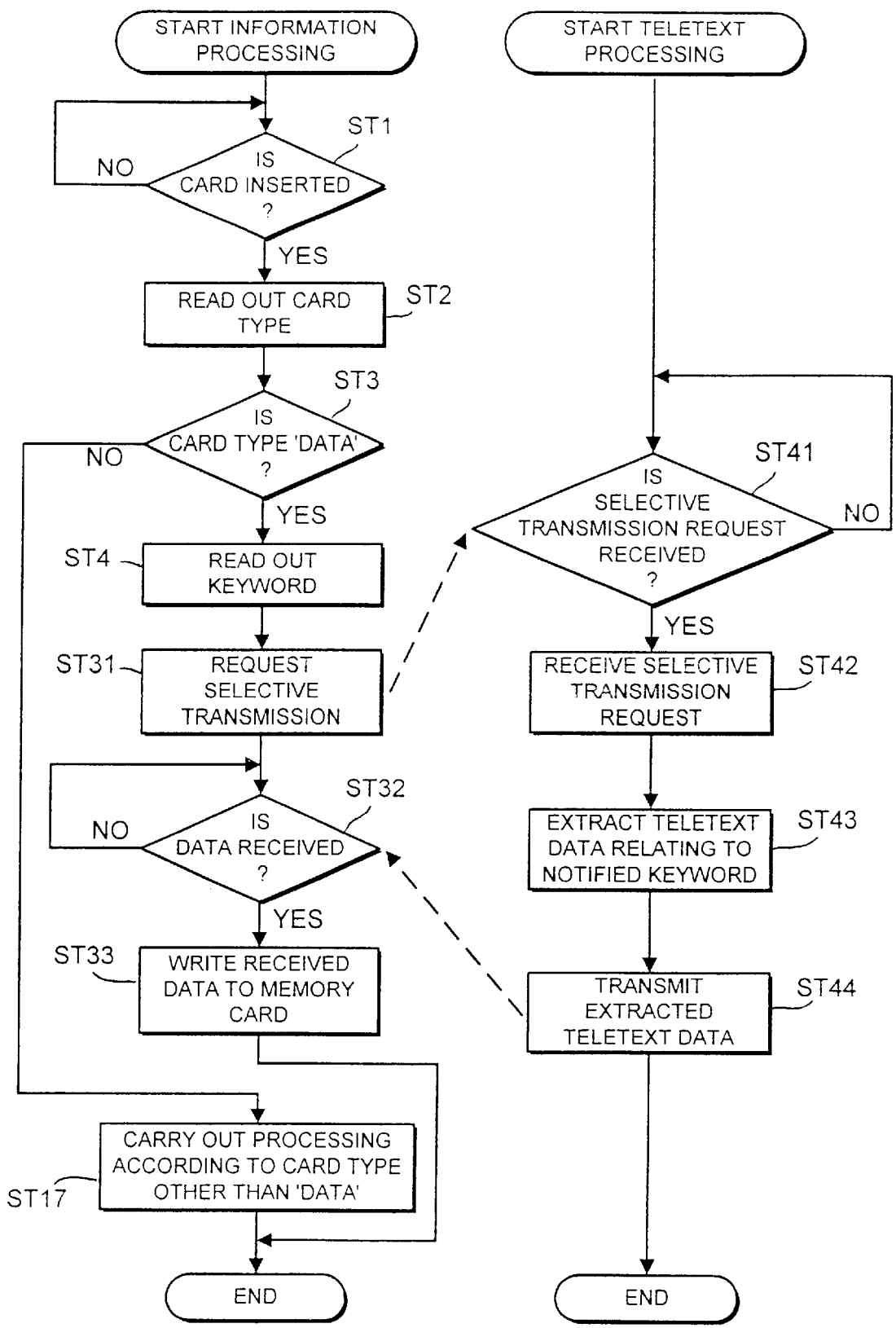
FIG. 11 is a flow chart showing the processing procedures of the information processor 22 and the teletext controller 26, as shown in FIG. 10.

Next, the operation of the information service receiving apparatus 400 constructed as described above will be explained according to the processing order of the information processor 22a and the teletext controller 26, as shown in FIG. 11.

First, the information processor 22 performs the operation of the step ST1 through step ST4 and the step ST7 as the same way as the information processor 17 in the first embodiment. After the keyword has been read at the step ST4, the information processor 22 requests the selective transmission to the information service providing apparatus 500 (step ST31). After the communication line between the information service providing apparatus 500 via the telephone line C is established, as shown in FIG. 10, by the automatic dialing of the telephone number of the information service providing apparatus 500 which has been preset via the modem, the identification information of the service receiver (for instance the telephone number or code which has been preset by the service provider) or the keyword which has been read out at the step ST4 are supplied to the information service providing 500 in the specific order. In step ST31, the information processor 22 instructs the Information filter 21 to output the teletext program data directed to the information processor 22 itself. Here, these operations mentioned above, are performed by the selective transmission requestor 22a.

The teletext controller 26 in the information service providing apparatus 500 is waiting for the selective transmission request to be generated at the await state (step ST41). So, when the selective transmission request from the information service receiving'apparatus 400, as mentioned above is performed at this state, the teletext controller 26 receives the selective transmission request by the selective transmission request receiver 26a (step ST42), and extracts the teletext program data relating to the keyword notified at the selective transmission request from the teletext program data stored in the teletext program memory 23 by the requested data extractor 26b (step ST43).

Then, the teletext controlling device 26 performs to transmit the teletext program data extracted at the step ST43 by the teletext in the requested data transmission controller 26c (step ST44). That is, the teletext controller 26 applies the teletext program data extracted at the step ST43 to the teletext transmission signal generating device 24, at the same time it adds the identification information of the selective transmission requester to the teletext program data as the address information. The teletext program data accompanying the address information is converted into the teletext signal in the teletext signal generator 24 and carried in the vertical blanking period of the video signal among the TV broadcasting signals which are supplied to the TV broadcasting device 29 from the TV transmission system 28 in the multiplexer 25. The video signal carrying the audio signal and the teletext signal Is modulated in the TV broadcasting device 29 so as to be broadcasted from of the antenna 30 as a TV broadcast wave.

Accordingly, when the TV broadcast wave aired by the antenna 30 is received by the antenna 8, the teletext signal is extracted from the output signal of the antenna 8 by the video signal processing block 3 and teletext program data are reproduced, so that, the teletext program data is supplied to the information filter 21 At that time since the information filter 21 is instructed to extract the teletext program data directed to the information filter 21 itself by the information processor 22, the information filter 21 supplies the teletext program data to the information processor 22 when the teletext program data to which its own identification information is added as the address information is supplied as mentioned above.

The information processor 22, after performing the selective transmission request at the step ST31, waits for the teletext program data directed to the processor 22 itself have been received (step ST32). When the information processor 22 is supplied with the teletext program data from the information filter 21 as mentioned above, the information processor 22 writes the teletext program data supplied from the information filter 21 in the memory card 9 (step ST33).

According to this embodiment as described above, it can obtain the same effects as those in the first embodiment.

Furthermore, according to this embodiment, it allows for easy construction of the information service receiving apparatus 400 without having the function for extracting data relating to the keyword from a vast amount of teletext program data on the information service receiving apparatus 400 side. The information service receiving apparatus 400 in this embodiment also has the information filter 21 for monitoring address information accompanying with the teletext program data to detect a specific address information matching with its own identification information. Thus the information filter 21 can be constructed in a simple form than that which performs complicated processes to extract a specific data associated with the keyword from a vast amount of teletext program data like Information filter 16 of the first embodiment.

Here, the present invention is not limited to each embodiment described above. For instance, in each embodiment, the memory card 9 sets up a part of the memory block 92 as memory space of the card managing information and prohibits the rewriting of the card managing information by the control block 92 However, it may equip any means for neglecting instructions of rewriting the card managing information in the side of the information service receiving device, without a rewrite-protector against the card managing information in the side of the memory card 9.

And, in each embodiment, the card managing information stored in the storage medium is protected from rewriting as long as there is no specific rewrite-unprotect instruction. However, the card may be free to rewrite the card managing information. In this case, the keyword in the card managing information can be set desirably and it is also able to obtain the data relating to the keyword.

And, each embodiment uses the memory card as a storage medium. However, it is possible to apply other storage medium such as a floppy disc.

In the third embodiment, it mentioned the E-mail as its object. However, it is possible to obtain the same operation by taking the hyper text or picture data as its object.

The third and fourth embodiments may have the expiration term control in the second embodiment in addition to the original functions.

In the fourth embodiment, the information service providing apparatus 500 transmits the requested data via the teletext. However It may transmit the data via the telephone line.

Besides, the present invention may be modified without departing from the scope of the principle of the present invention.

The information service receiving apparatus according to the first aspect of the present invention is provided with a managing information reader for reading in the managing information presto red in the inserted removable storage medium, a principal information capturer for capturing the principal information which is provided by a specific information service provider, a specific information extractor for extracting specific information which has a specific relation with a key code contained in the managing information read out by the managing information reader from the principal information captured by the principal information capturer, and a data writer for writing the specific information extracted by the specific information extractor into the inserted storage medium.

The information service receiving apparatus according to the second aspect of the present invention is provided with a managing information reader for reading the managing information presto red in a removable storage medium when the storage medium has been inserted, a principal information reader for reading the specific principal information which has been stored in the storage medium out when the information which specifies the information transmission to the other terminal via the specific information service provider is contained in the managing information read out by the managing information reader, and a principal information transmitter for transmitting the principal information readout by the principal information reader to the information service provider.

The information service receiving apparatus according to the third aspect of the present invention is provided with a managing information reader for reading in the managing information presto red in the removable storage medium when the storage medium is inserted, a key code notifier for notifying the key code contained in the managing information read-out by the managing information reader to the specific information service provider, a principal information capturer for capturing the principal information provided by the information service provider according to the notification of the key code notified by the key code notifier, and a data writer for writing the principal information captured by the principal information capturer in the inserted storage medium.

The information service receiving apparatus according to the fourth aspect of the present invention is provided with a clock device for presenting clock information, and a prohibitor for prohibiting both the writing of the specific information in the storage medium and the transmission of the principal information stored in the storage medium when the clock information presented by the clock device had expired the term of validity which is presented in the managing information readout by the managing information reader.

Accordingly, the information service receiving apparatus is able to write the information in the storage medium effectively without implying burden to the user at the information service receiving apparatus.

According to the fifth aspect of the present invention, since the information service providing apparatus for providing a lot of information available to the providing apparatus itself to the specific information service receiving apparatus as necessary is so arranged that it is provided with a specific information extractor responsive to a notification of predetermined key code from the information service receiving apparatus for extracting the specific information having a predetermined relationship with the notified key code from the lot of available principal information according to the specific key code, and a specific information transmitter for transmitting only the specific information extracted by the specific information extractor to the information service receiving apparatus originating the key code, the information service providing apparatus is able to arrange writing operations of the information in the storage medium to efficiently carry out the writing operations without burdening users of the information service receiving apparatus.

According to the sixth aspect of the present invention, since the storage medium has a memory space for storing the specific managing information indicating types of information services admitted in the information service receiving apparatus in a rewrite-protected manner, as long as there is at least no specific prohibition release instruction, and also for reading or writing any given principal information by the information service receiving apparatus, the storage medium becomes suitable for the Information service receiving apparatus which is able to effectively write information in the storage medium without implying burden to the user on the information service receiving apparatus.

As described above, the present invention can provide an extremely preferable an information service receiving apparatus, an information service providing apparatus and a storage medium suitable for use with the information service receiving apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor it is intended that the present Invention not be limited to the particular embodiment disclosed as the best mode contemplated for carrying out the present invention, but that the present invention includes all embodiments falling within the scope of the appended claims. The foregoing description and the drawings are regarded by the applicant as including a variety of individually inventive concepts, some of which may lie partially or wholly outside the scope of some or all of the following claims.

The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. An information service receiving apparatus comprising:
   managing information readout means for reading managing information prestored in a removable storage medium while the storage medium is inserted;
   principal information capturing means for capturing principal information provided by a predetermined information service provider;
   specific information extraction means for extracting specific information, which has a predetermined relationship with a key code contained in the managing information read out by the managing information readout means, from the principal information captured by the principal information capturing means;
   write means for writing the specific information extracted by the specific information extraction means in the inserted storage medium;
   clock means for presenting clock information; and
   prohibition processing means for prohibiting the writing of the specific information in the storage medium and the transmission of the principal information stored in the storage medium, when the clock information presented by the clock means had been over a term of validity, which is presented in the managing information read by the managing information readout means.

2. The information service receiving apparatus of claim 1, wherein the key code includes a program code defined to the information services provided by the information service provider.

3. A storage medium adapted for use with the information service receiving apparatus of claim 2, wherein the storage medium has a memory space for storing a managing information indicating a type of information service admitted for the information service receiving apparatus in rewrite-protected manner, as long as there is at least no specific prohibition release instruction, and also for reading or writing any given principal information by the information service receiving apparatus.

4. An information service receiving apparatus comprising:
   a managing information reader for reading managing information prestored in a removable storage medium while the storage medium is inserted;
   a principal information capturerer for capturing principal information provided by a predetermined information service provider;
   a specific information extractor for extracting specific information, which has a predetermined relationship with a key code contained in the managing information read out by the managing information reader, from the principal information captured by the principal information capturer;
   a data writer for writing the specific information extracted by the specific information extractor in the inserted storage medium;
   a clock device for presenting clock information; and
   a prohibition processor for prohibiting the writing of the specific information in the storage medium and a transmission of the principal information stored in the storage medium, when the clock information presented by the clock device had been over a term of validity, which is presented in the managing information read by the managing information reader.

5. The information service receiving apparatus of claim 4, wherein the key code includes a program code defined to information services provided by the information service provider.

6. A storage medium adapted for use with the information service receiving apparatus of claim 5, wherein the storage medium has a memory space for storing a managing information indicating a type of information service admitted for the information service receiving apparatus in rewrite-protected manner, as long as there is at least no specific prohibition release instruction, and also for reading or writing any given principal information by the information service receiving apparatus.

* * * * *